United States Patent
Breglio

(10) Patent No.: US 8,453,072 B2
(45) Date of Patent: May 28, 2013

(54) PARAMETER SETTING SUPERIMPOSED UPON AN IMAGE

(75) Inventor: Melissa Erin Breglio, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 29 days.

(21) Appl. No.: 13/110,794

(22) Filed: May 18, 2011

(65) Prior Publication Data
US 2011/0219329 A1    Sep. 8, 2011

Related U.S. Application Data

(63) Continuation of application No. 11/724,938, filed on Mar. 16, 2007, now Pat. No. 7,954,067.

(51) Int. Cl.
*G06F 3/00*       (2006.01)
*G06F 3/0484*   (2006.01)
*G06F 3/048*     (2006.01)
*G06F 3/01*       (2006.01)

(52) U.S. Cl.
CPC ............ *G06F 3/04847* (2013.01); *G06F 3/048* (2013.01); *G06F 3/0484* (2013.01); *G06F 3/017* (2013.01)
USPC ............................. 715/833; 715/810; 715/763

(58) Field of Classification Search
CPC ......... G06F 3/017; G06F 3/048; G06F 3/0484; G06F 3/04847
USPC .......................................... 715/833, 763, 810
See application file for complete search history.

(56) References Cited

U.S. PATENT DOCUMENTS

| | | | | |
|---|---|---|---|---|
| 5,053,758 A | * | 10/1991 | Cornett et al. | 345/174 |
| 5,559,301 A | * | 9/1996 | Bryan et al. | 84/653 |
| 5,704,050 A | | 12/1997 | Redpath | |
| 5,745,116 A | | 4/1998 | Pisutha-Arnond | |
| 5,751,285 A | * | 5/1998 | Kashiwagi et al. | 715/833 |
| 5,963,964 A | | 10/1999 | Nielsen | |
| 6,037,937 A | * | 3/2000 | Beaton et al. | 715/764 |

(Continued)

FOREIGN PATENT DOCUMENTS

| | | |
|---|---|---|
| EP | 0342838 A2 | 11/1989 |
| JP | 2002-262169 | 9/2002 |
| WO | 2006/056243 A1 | 6/2006 |

OTHER PUBLICATIONS

European Patent Office, "International Search Report," PCT/US2008/054015, dated May 30, 2008, 14 pages.

(Continued)

*Primary Examiner* — Ryan Pitaro
(74) *Attorney, Agent, or Firm* — Kilpatrick Townsend & Stockton LLP

(57) ABSTRACT

Tools and techniques allow visual media to be edited by superimposing a parameter adjusting mechanism on the visual media itself and adjusting parameter settings based on user input detected by the parameter adjusting mechanism. In a visual media editing application, the parameter adjusting mechanism is superimposed on visual media so that the user can keep his eyes on the visual media and so that the visual media itself is not obscured by other user interface controls and windows as the user edits it. The user sets control points on the visual media that act as a fixed reference points for subsequent user input. The parameter adjusting mechanism detects subsequent user input calculates new parameter settings based on that input.

24 Claims, 7 Drawing Sheets

U.S. PATENT DOCUMENTS

| | | | |
|---|---|---|---|
| 6,078,746 A | 6/2000 | Simonyi | |
| 6,728,421 B2 | 4/2004 | Kokemohr | |
| 7,031,547 B2 * | 4/2006 | Kokemohr | 382/260 |
| 7,286,131 B2 | 10/2007 | Brodie et al. | |
| 7,712,039 B2 * | 5/2010 | Banks | 715/772 |
| 8,185,843 B2 * | 5/2012 | Bhatt et al. | 715/802 |
| 2004/0125081 A1 | 7/2004 | Hayakawa | |
| 2005/0034083 A1 | 2/2005 | Jaeger | |
| 2005/0175260 A1 | 8/2005 | Takahashi | |
| 2006/0267985 A1 | 11/2006 | Brodie et al. | |
| 2007/0075981 A1 * | 4/2007 | Hsieh et al. | 345/173 |
| 2007/0192744 A1 | 8/2007 | Reponen | |
| 2007/0234223 A1 | 10/2007 | Leavitt et al. | |
| 2007/0294634 A1 * | 12/2007 | Kokemohr | 715/781 |
| 2008/0005684 A1 | 1/2008 | Ochs et al. | |
| 2008/0036732 A1 | 2/2008 | Wilson et al. | |
| 2008/0104505 A1 | 5/2008 | Keohane et al. | |
| 2008/0120571 A1 * | 5/2008 | Chang et al. | 715/810 |
| 2008/0144954 A1 | 6/2008 | Chien et al. | |
| 2008/0225058 A1 | 9/2008 | Hertzfeld et al. | |
| 2008/0226199 A1 | 9/2008 | Breglio | |
| 2009/0235193 A1 * | 9/2009 | Bhatt et al. | 715/765 |
| 2011/0029865 A1 * | 2/2011 | Gilland et al. | 715/702 |
| 2011/0227589 A1 * | 9/2011 | Philipp | 324/686 |

OTHER PUBLICATIONS

Claims, PCT/US2008/054015, 4 pages.
PCT/US2008/054015 International Preliminary Report on Patentability mailed Oct. 1, 2009.
Japanese Office Action received in Application No. 2009-553666 dated Nov. 29, 2011 (8 pages).
Current Claims in Japanese Application No. 2009-553666 dated Nov. 2011 (3 pages).
Endo, E., "Adobe Photoshop A to Z" Japan, BNN, Inc. dated Feb. 15, 1993, 14 pages.
Office Action received in European Application No. 08729909.5 dated Jan. 9, 2012 (7 pages).
Current Claims of European Application No. 08729909.5 dated Jan. 2012 (8 pages).
Poon et al., "Gestural User Interface Technique for Controlling The Playback of Sequential Media", Xerox Disclosure Journal, Xerox Corporation, vol. 19, No. 2, Mar. 1994, XP000435062, pp. 187-189.

* cited by examiner

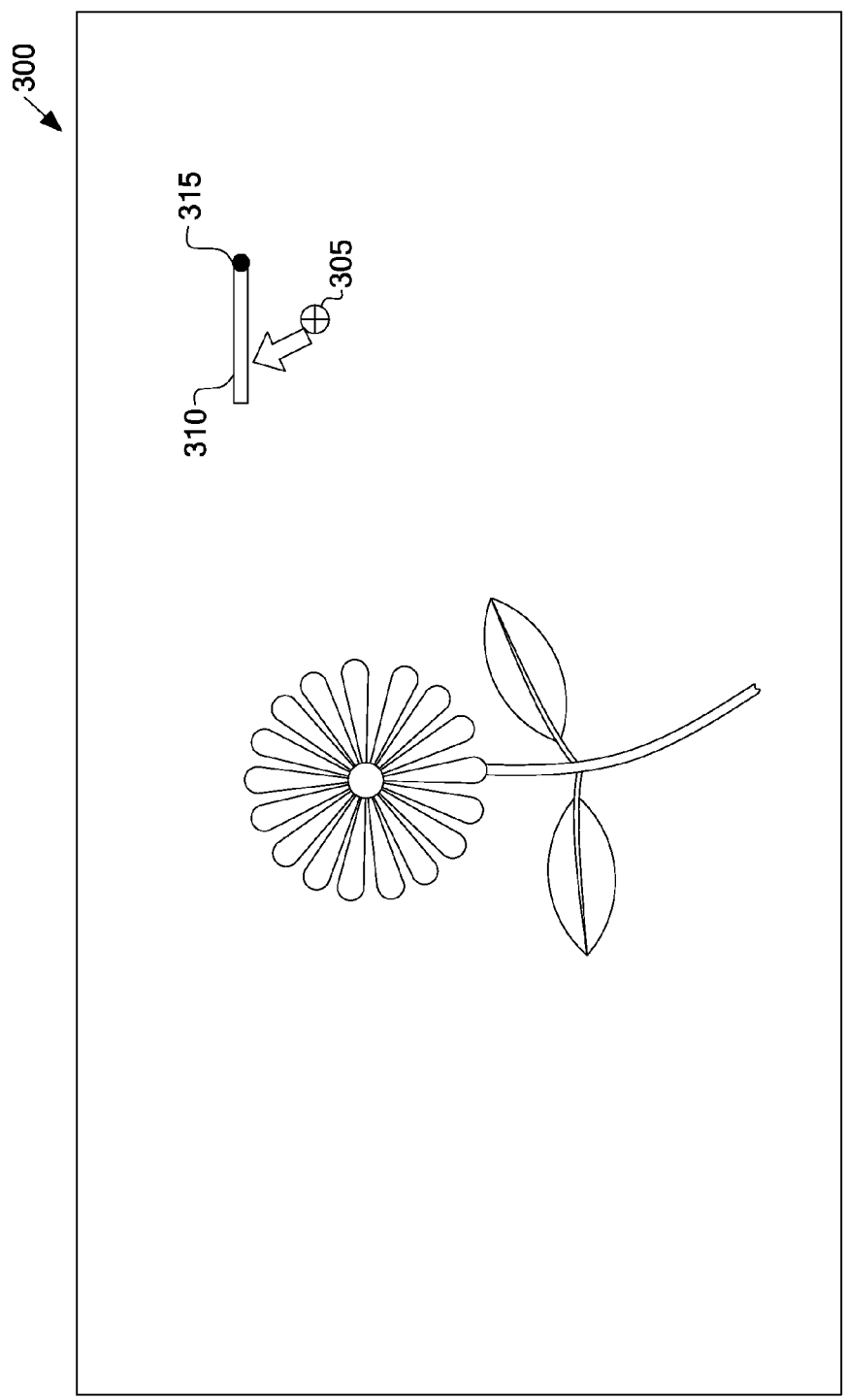

PARAMETER SETTING SUPERIMPOSED UPON AN IMAGE

CROSS-REFERENCES TO OTHER APPLICATIONS

This application is a continuation of U.S. patent application Ser. No. 11/724,938 filed Mar. 16, 2007 now U.S. Pat. No. 7,954,067 which is incorporated herein by reference as if fully set forth herein, under 35 U.S.C. §120.

This application is related to U.S. patent application Ser. No. 11/725,124 entitled "Full Screen Editing of Visual Media", filed by Schulz et al. on Mar. 16, 2007, the entire contents of which is hereby incorporated by reference for all purposes as if fully set forth herein.

BACKGROUND

Over the last few years, visual media arts, such as photography and motion pictures, have become more sophisticated. In fact, applications that allow a user to create and edit images, film, and other visual content are becoming commonplace. For example, a photographer may use a digital camera to take high-resolution photographs, which are then imported to a computer. Thereafter the user edits the photographs using photo-editing software executing on the computer.

Conventional photo-editing applications have user interfaces that include separate windows for different features available to users. For example, an image, imported from a digital camera to a computer for editing by an application executing on the computer, is typically displayed by the application in one window, while the controls to adjust the appearance of the image are displayed in another window. The available space displayed on the screen by the application must be large enough to accommodate both the image being edited and the controls for performing the editing. One of the problems with conventional photo-editing applications is that as the capabilities provided by photo-editing applications increase, the controls to perform these new functions occupy more and more area on the interface provided by these applications.

To illustrate, consider that the user interface for a conventional photo-editing application typically includes a toolbar and menu options. The toolbar and menu options take up a portion of the screen. Within the user interface, the image being edited takes up another portion of the screen. Then, in addition, other windows that contain editing tools and other features may take up yet other portions of the screen. In the end, a large portion of the screen space is used to display content other than the image being edited. In fact, even if the user expands the image to fill the entire photo-editing application, a portion of the image is still obscured by the application's other user interface controls. As a result, when the user modifies the image, the user only sees the changes that occur to the visible portion of the image.

In addition to obscuring portions of the image, user interface controls also require the user to take his eyes off the image when he makes adjustments to it. For example, since adjustment controls are in a separate window from where the image is, the user has to look at the adjustment control, adjust it, look at the image to see how the change affects the image, look back at the adjustment control, adjust it some more, look back at the image to see the effect of the additional changes, look back at the adjustment controls, and so forth until the user has made all the necessary changes.

This process is inefficient and distracts from the editing process. It requires the user to take his eyes off the visual media to adjust settings and then look back at the image only after the changes have already been applied. Thus, the full effect of the changes to the visual media is only perceived once the user looks back at it. Then if the user does not like the change, he has to go back to the adjustment controls to make further edits to the settings.

To reduce this problem, some visual media editing applications use a HUD (heads-up display). A HUD is a user interface control that is mostly transparent so that a user can see through it to the underlying content. The purpose behind a HUD is to allow the user to bring controls closer to where the user is editing the visual media. Thus, the eye movement between the visual media and editing controls is lessened. Often, the user can position a HUD over the content before making adjustments to the visual media. A problem, however, with the use of HUDs is that although they provide some degree of transparency, they still obscure some portions of the visual media as it is being edited.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments of the present invention are illustrated by way of example, and not by way of limitation, in the figures of the accompanying drawings and in which like reference numerals refer to similar elements and in which:

FIG. 3B is a depiction of an example editing window displaying how adjustment can be made directly on the visual media, according to an embodiment of the invention;

DETAILED DESCRIPTION

Figure 1:
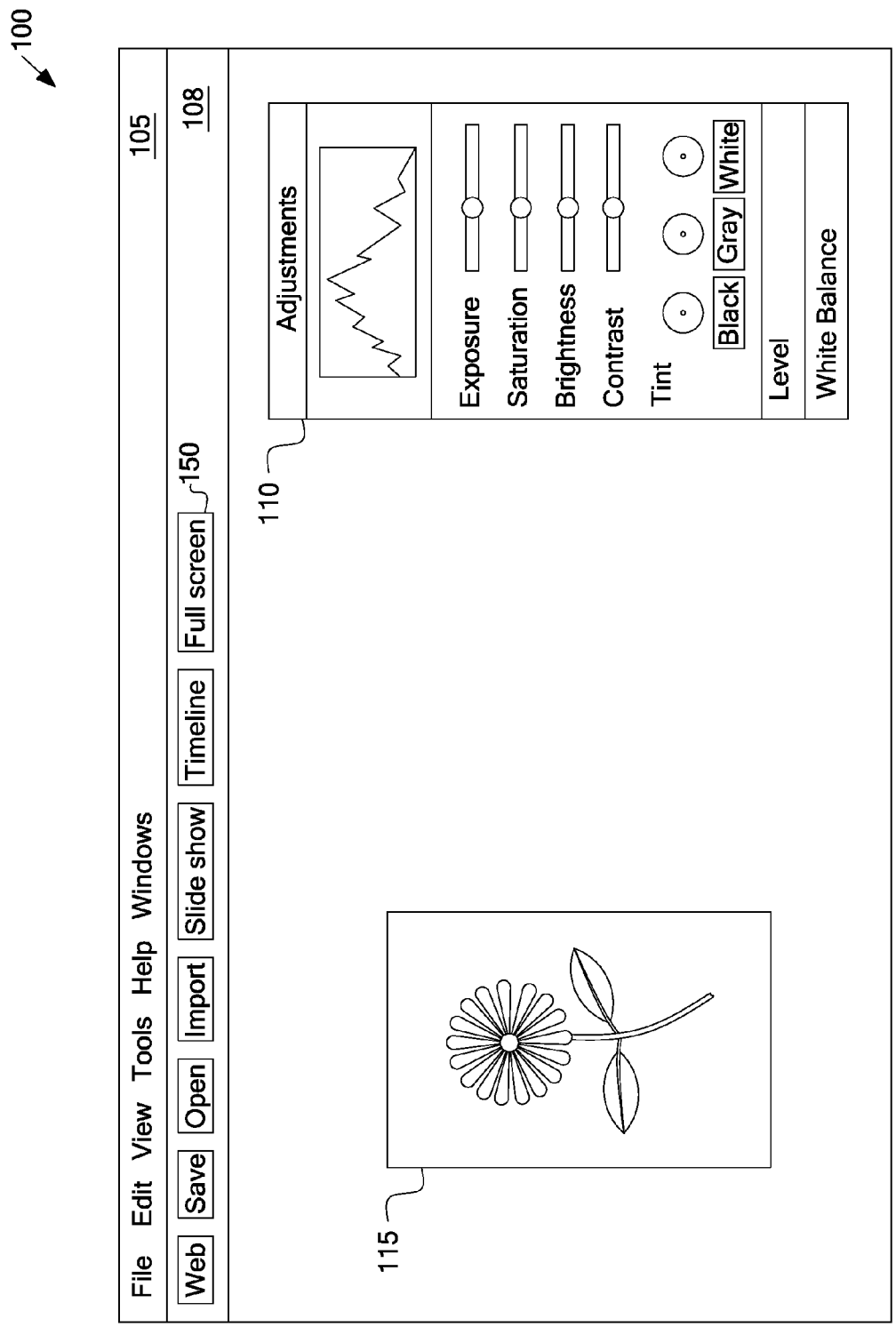
FIG. 1 is a depiction of an example user interface in a visual media editing application, according to an embodiment of the invention.

In the following description, for the purposes of explanation, numerous specific details are set forth in order to provide a thorough understanding of the embodiments of the present invention discussed herein. It will be apparent, however, that the embodiments of the present invention discussed herein may be practiced without these specific details. In other instances, well-known structures and devices are shown in block diagram form in order to avoid unnecessarily obscuring the embodiments of the present invention discussed herein.

Functional Overview

Tools and techniques described herein provide mechanisms that allow a user, using a visual media editing application, to edit visual media by superimposing a parameter adjusting mechanism on the visual media itself. In one embodiment, the parameter adjusting mechanism is not shown visibly (or at the very least only a minimal visual representation of the mechanism is shown) on the screen and, therefore, does not occupy screen space. Instead the mechanism detects user input (e.g., mouse movements or movements from some other type of input device) and adjusts parameter settings based on the user input.

For example, in a photo-editing application, a user may wish to enhance the brightness setting of an image. Assuming the user is using a mouse, the user clicks and holds down a mouse button and they drag the mouse pointer. Thus, as the user moves his mouse pointer (e.g., to the left, right, up, or down), the brightness setting for the image adjusts. Virtually no user interface control is visible while adjustments are made. Moreover, the changes are automatically applied to the visual media as the user moves his mouse pointer. In one embodiment, the brightness setting is saved when the user unclicks the image (e.g., releases the mouse button). In this way, the user can keep his eyes directly on the visual media as a parameter setting is changed.

In addition, tools and techniques allow the parameters settings to be changed without unnecessarily obscuring any of the visual media itself. In one embodiment, the parameter adjusting mechanism can be used in a full screen mode, which provides a maximal view of the visual media being edited.

Tools and techniques described herein further provide mechanisms which allow a user, using a visual media editing application, to select which parameter will be modified by the parameter adjusting mechanism. In this way, a user can switch from adjusting one parameter to another using the parameter adjusting mechanism.

Visual Media Editing Application Environment

The procedures and tools described in this invention are often described in terms of visual media editing technology and, more specifically, photo-editing technology. These environments are meant only to serve as exemplary environments in which the techniques of the present invention are employed. In alternative implementations, the techniques may be employed in other environments.

Visual Media

Visual media includes content and data objects that are editable by a visual media editing application. As used herein, visual media is not limited to any particular structure or file format. For example, visual media can refer to an image in a photo-editing tool, a still image in a movie-editing application, a visual display of a sound file in a sound player, a Web page in a design application, elements of a CAD file, a 3D animated object, a movie file, and other types of data objects.

Visual Media Editing User Interface

A visual media editing user interface generally refers to the portion of a visual media editing application with which a user interacts. The visual media editing user interface provides user interface controls such as buttons, windows, menus, and toolbars that allow a user to edit visual media. An example visual media editing user interface is illustrated in FIG. 1.

FIG. 1 depicts an example visual media editing user interface 100 that includes the following features of a visual media editing application: file menu 105, toolbar 108, editing window 115, and adjustments window 110. In addition, visual media editing user interface 100 can include a number of other controls that allow the user to save, open, import, and perform other functions in a visual media editing context. User interface 100 can also include a full screen control 150.

In one embodiment, visual media editing user interface 100 includes a different set of features.

Some Features of the User Interface

File menu 105 and toolbar 108 illustrate the types of user interface controls available in a visual media editing application. For example, file menu 105 includes menus such as file, edit, view, tools, help, and windows that when selected provide the user with additional options to help the user open, save, edit visual media. The help menu can include a feature to search online documentation and access tutorials. The windows menu allows the user to switch between projects. The tools menu, when selected, displays additional tools that can be used to edit the displayed image. Similarly, toolbar 110 includes a variety of buttons that, when selected, prompt the user to upload content to the web, save it, open a new file, import content into the application, make a slideshow, etc.

In one embodiment, editing window 115 refers to that portion of the user interface where the visual media is displayed. As edits and adjustments are made to visual media, editing window 115 updates to show those changes. In one embodiment, editing window 115 can be expanded to a full-screen mode. In full-screen mode, editing window 115 takes up the entirety of visual media editing user interface 100.

Adjustments window 110 is a user interface control that includes other controls (sometimes called "inspectors") that allow the user to adjust parameters that affect the appearance of the visual media displayed in editing window 115. The controls displayed in adjustments window 110 when selected and adjusted cause the visual media in editing window 115 to change in appearance according to changes made to the settings in adjustments window 110. For example, suppose the visual media in editing window 115 is an image. Because it is an image, adjustments window 110 may include inspectors such as an exposure control, saturation control, and brightness control that modify some of the basic parameters of the image. When the user adjusts one of those inspectors, the adjustment is applied to the image in the editing window 115. For instance, if the user changes the image's brightness setting, then a corresponding change is made to the image.

Note that the features illustrated in FIG. 1 are examples of the types of features that may be available in a visual media editing user interface. In another embodiment, a different set of user interface controls may be used.

Parameter Setting

Figure 2:
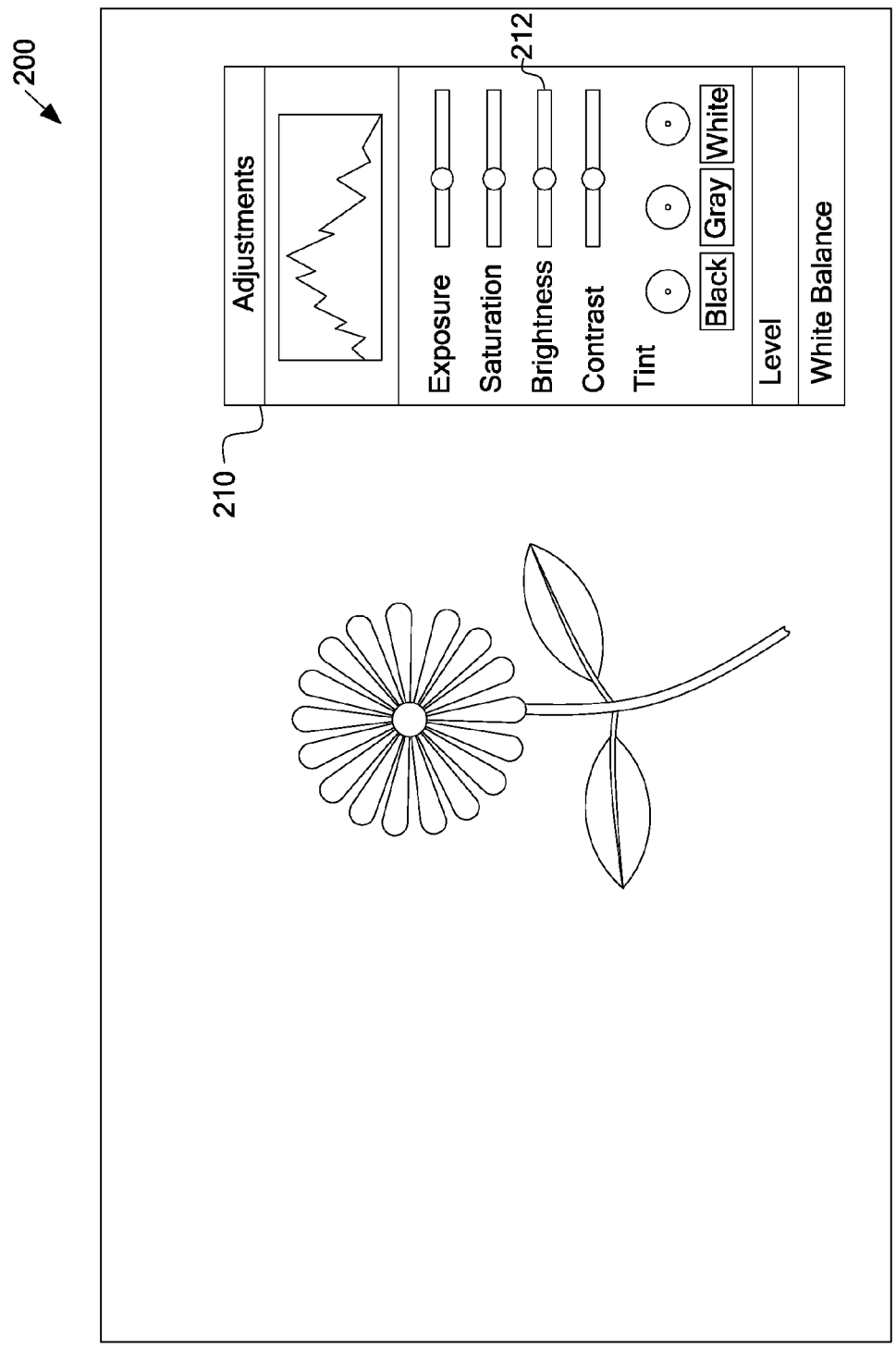
FIG. 2 is a depiction of an example editing window, according to an embodiment of the invention.

Using controls described herein, a user can edit visual media parameter settings. A parameter setting generally refers to an assigned value for an individual property of the visual media on display. A user adjusts a parameter setting by specifying a new value in a range of acceptable values. To illustrate, consider FIG. 2. FIG. 2 depicts visual media editing window 200.

In FIG. 2, adjustments window 210 in editing window 200 lists a variety of parameters (e.g., exposure, saturation, brightness, contrast, and tint) that describe individual properties of the visual media on display. The parameter setting for each of the listed properties is defined by the parameter's slider control. For instance, brightness slider 212 is set at just under the halfway point along the slider's value range.

Accordingly, if the brightness slider has a standard range from 0 to 100, then the brightness setting for the visual media illustrated in window 200 is around 40. As illustrated, the parameter settings for exposure, saturation, contrast, and tint are also around 40 as well. The parameter settings can be modified by a parameter adjusting mechanism.

Parameter Adjusting Mechanism

To modify parameter settings without obscuring the visual media and without requiring the user to take his eyes off the media, in one embodiment, a parameter adjusting mechanism is superimposed on the visual media. According to one embodiment, the parameter adjusting mechanism takes up a minimal amount of screen space. The parameter adjusting mechanism includes user interface controls that are superimposed on top of the visual media being edited. The user interface controls are superimposed in a way that does not obscure the image and does not require the user to take his eyes off the visual media while a parameter setting is modified. In one embodiment, the parameter adjusting mechanism takes up no screen space at all. In this embodiment, the parameter adjusting mechanism includes non-visible user interface controls that detect user input and translates that user input into parameter setting adjustments.

Figure 3A:
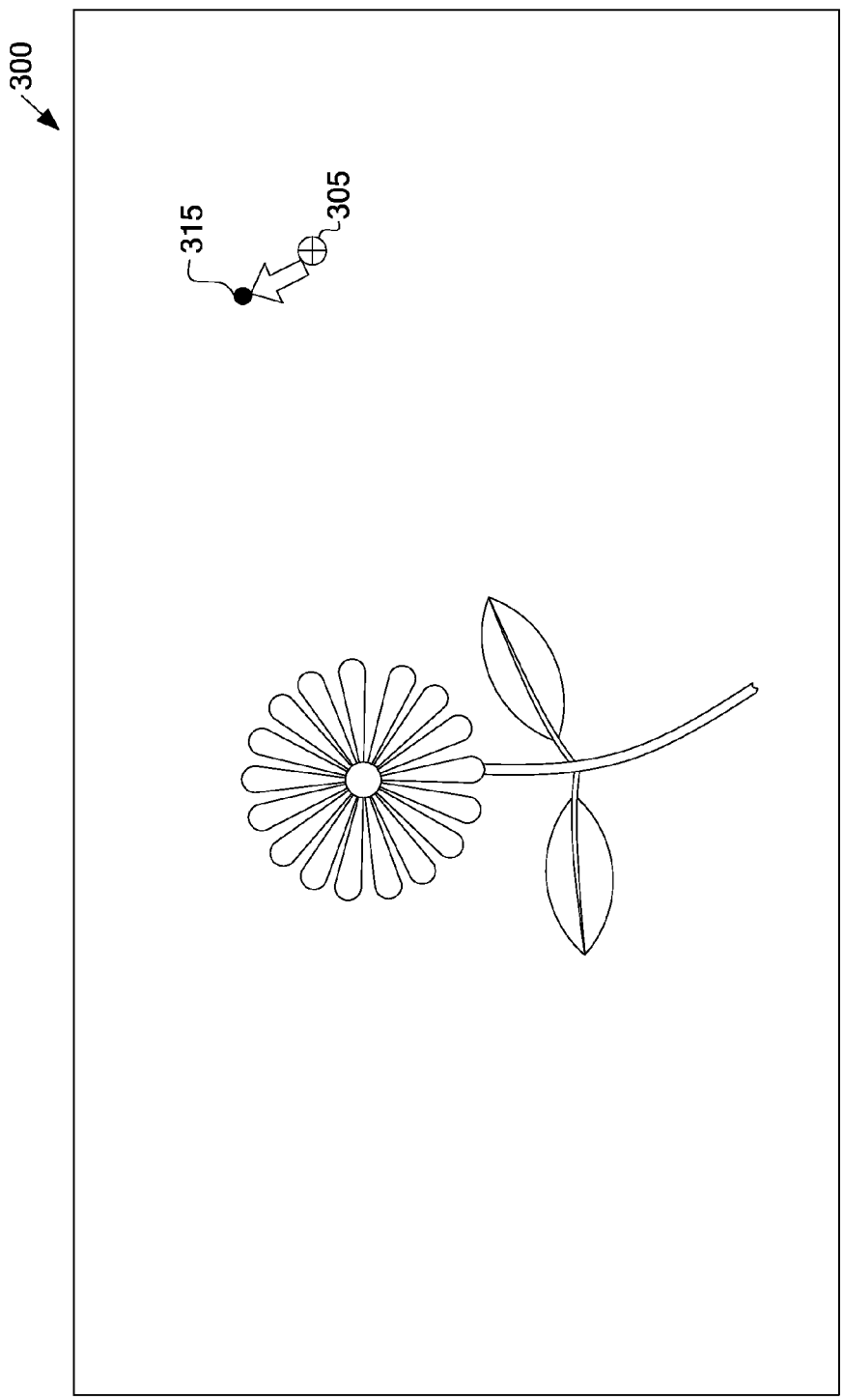
FIG. 3A is a depiction of an example editing window displaying a control point, according to an embodiment of the invention.

FIG. 3A illustrates editing window 300 that includes visual media to be edited. Editing window 300, in one embodiment, is part of a larger user interface (e.g., it may be the editing window of a visual media editing application like editing window 115 in FIG. 1). Alternatively, editing window 300 may be a visual media editing user interface in full-screen mode.

In FIG. 3A, the visible features of the parameter adjusting mechanism include: 1) parameter selection control 305 to indicate which parameter was selected and 2) control point 315 to indicate a fixed starting point for calculating adjustments to the selected parameter. In addition, the parameter adjusting mechanism also includes an input detector that is part of the underlying application that tracks movements from a user input device and translates that input into parameter setting adjustments. For example, in one embodiment, when a user uses his mouse pointer to move the cursor to the left within editing window 300, those mouse movements are detected by the input detector and translated into value changes that are applied to the current parameter setting.

Selecting a Parameter Setting

Selecting which parameter the parameter adjusting mechanism adjusts can be done in a variety of ways. In one embodiment, the user is presented with a set of controls in a visual media editing user interface and the user simply selects (e.g., by clicking with his mouse) the parameter he would like to modify.

For example, in the visual media editing user interface illustrated in FIG. 1, the user might select a control from the menu bar 105 or toolbar 108 which prompts the user to select a parameter to be modified by the parameter adjusting mechanism. After the user makes a selection, that parameter becomes the current parameter, e.g., the parameter assigned to the parameter adjusting mechanism. Accordingly, any adjustments made to the parameter adjusting mechanism are applied to the current parameter's settings. Any modifications to the current parameter's settings are automatically applied to the visual media being displayed.

Similarly, the user may be able to select a parameter from an adjustments window, such as adjustments window 210 illustrated in FIG. 2. The selection of a parameter in the adjustments window can automatically make that that parameter the current parameter for the parameter adjusting mechanism. For example, adjustments window 210 lists parameters associated with the visual media that, in one embodiment, the user can select (e.g., by clicking on a parameter control with his mouse pointer). By selecting a parameter, the user assigns that parameter to the parameter adjusting mechanism. For example, if the user selects brightness control 212, the current parameter in the parameter adjusting mechanism becomes the brightness parameter. Then, any modifications made by the user to the parameter adjusting mechanism affect the brightness setting for the displayed visual media.

In one embodiment, the adjustments window is a HUD.

In a full-screen embodiment, the user may select the parameter to be modified by accessing bump controls in bump areas. Bump controls are user interface controls hidden at locations on screen called bump areas. When a user accesses a bump area, the bump control hidden at that location opens on the display. Bump controls and bump areas are described in the co-pending patent application Ser. No. 11/725,124 entitled "Full Screen Editing of Visual Media", filed by Schulz et al. on Mar. 16, 2007, which is incorporated by reference in its entirety herein.

In other embodiments, the visual media editing application may include different mechanisms for allowing the user to assign the various parameters to the parameter adjusting mechanism.

In one embodiment, the user can select two or more parameters to assign to the parameter adjusting mechanism. In this embodiment, changes made to one parameter may automatically carry over to the other selected parameter(s). Alternatively, the user may differentiate between types of user input and assign specific types of input to different parameters. For example, the user may define certain types of mouse movements, such as moving left to right horizontally, as the mechanisms for adjusting the brightness setting. While, moving the mouse pointer up and down adjusts a tint setting. In other embodiments, different combinations of user input can be used to control parameter settings.

Once the user selects a parameter, in one embodiment, all the other user interface controls obscuring the current editing window are hidden from view. For example, in FIG. 2, once the user has selected the brightness parameter, adjustments window 210 is automatically hidden from view (e.g., the adjustments windows may be moved behind the current window display, placed into a bump area, etc.). Alternatively, the user may simply bring the visual media editing window to the foreground.

FIG. 3A illustrates editing window 300. It displays visual media once all the other user interface controls have been hidden from view, with a couple limited exceptions. As discussed below, control point 315 and parameter selection control 305 may remain in the display to guide the user as he modifies parameters through the parameter adjusting mechanism.

Parameter Selection Control

Parameter selection control 305 refers to a visual indication on screen of the parameter currently assigned to the parameter adjusting mechanism. It is not necessary to be displayed, but, when it is, it serves to remind the user which parameter is currently selected. The visual indication can be a small icon or other small visual representation that indicates the current parameter. In one embodiment, the parameter selection control is connected on screen to the user's cursor.

Alternatively, it may be located elsewhere on screen (e.g., in a corner of the editing window, at the bottom of the screen, etc.).

For example, if the user elects to modify the brightness parameter of the visual media displayed in editing window 300, then a small brightness icon (e.g., selection control 305) is attached to the cursor, reminding the user that the brightness parameter is the current parameter. Similarly, if the user elects a different parameter, then a different visual indication is displayed.

In one embodiment, the parameter selection control may also display additional information such as the value of the parameter as it is modified. For example, if an image has a current brightness setting of 50, then a small number "50" is placed in the center of the parameter selection control. Then, as the user modifies the brightness setting, the parameter selection control is updated to reflect changes in value.

Control Point

Once a parameter has been assigned to the parameter adjusting mechanism, the parameter adjusting mechanism is superimposed on the visual media. As noted above, there may not be any visible display of the parameter adjusting mechanism on the visual media. However, for explanation purposes, it is assumed that the parameter adjusting mechanism provides at least a small visual indication of a control point on screen.

The control point serves as a fixed reference point from which modifications to a parameter can be calculated. As a result, when a user inputs an "insert control point" command (e.g., by clicking on the visual media with his mouse pointer), a fixed reference point is created so that any movement away from it causes the current parameter setting to change.

For example, in FIG. 3A, suppose a user wants to modify the brightness setting for the visual media displayed in editing window 300. Accordingly, the user clicks with his mouse pointer anywhere in editing window 300. By doing so, control point 315 is created and set at that point. Control point 315 serves as the fixed reference point for the parameter being adjusted. As the user moves his mouse pointer to the left, in one embodiment, the mouse movement is detected and translated into an adjustment value that is applied to the brightness setting for the visual media. Accordingly, as the user moves his mouse pointer the visual media's brightness setting changes. It should be noted that very few pixels of the visual media (if any) are obscured by control point 315.

Input Detector

The input detector is another aspect of the parameter adjusting mechanism. In one embodiment, the input detector refers to a set of underlying components in the visual media editing application that detect when a user inputs a control point in an editing window and further detects any input after the control point has been set. By doing so, the input detector can calculate when and how adjustments are made to the current parameter.

In one embodiment, the input detector converts detected user input on the parameter adjusting mechanism into an adjustment value that can be added or subtracted from the current parameter setting. To illustrate, consider FIG. 3B. The features in FIG. 3B correspond to similar features in FIG. 3A. In FIG. 3B, suppose a user would like to modify the brightness setting of an image in a photo-editing application. The user inputs, with his mouse pointer, control point 315 and then moves his mouse pointer to the left. Mouse movement 310 is detected by the parameter adjusting mechanism's input detector. In one embodiment, a visual representation of mouse movement 310 is displayed on the screen (e.g., as a small horizontal line). Alternatively, it may be visually displayed in a different way or not at all.

Figure 3C:
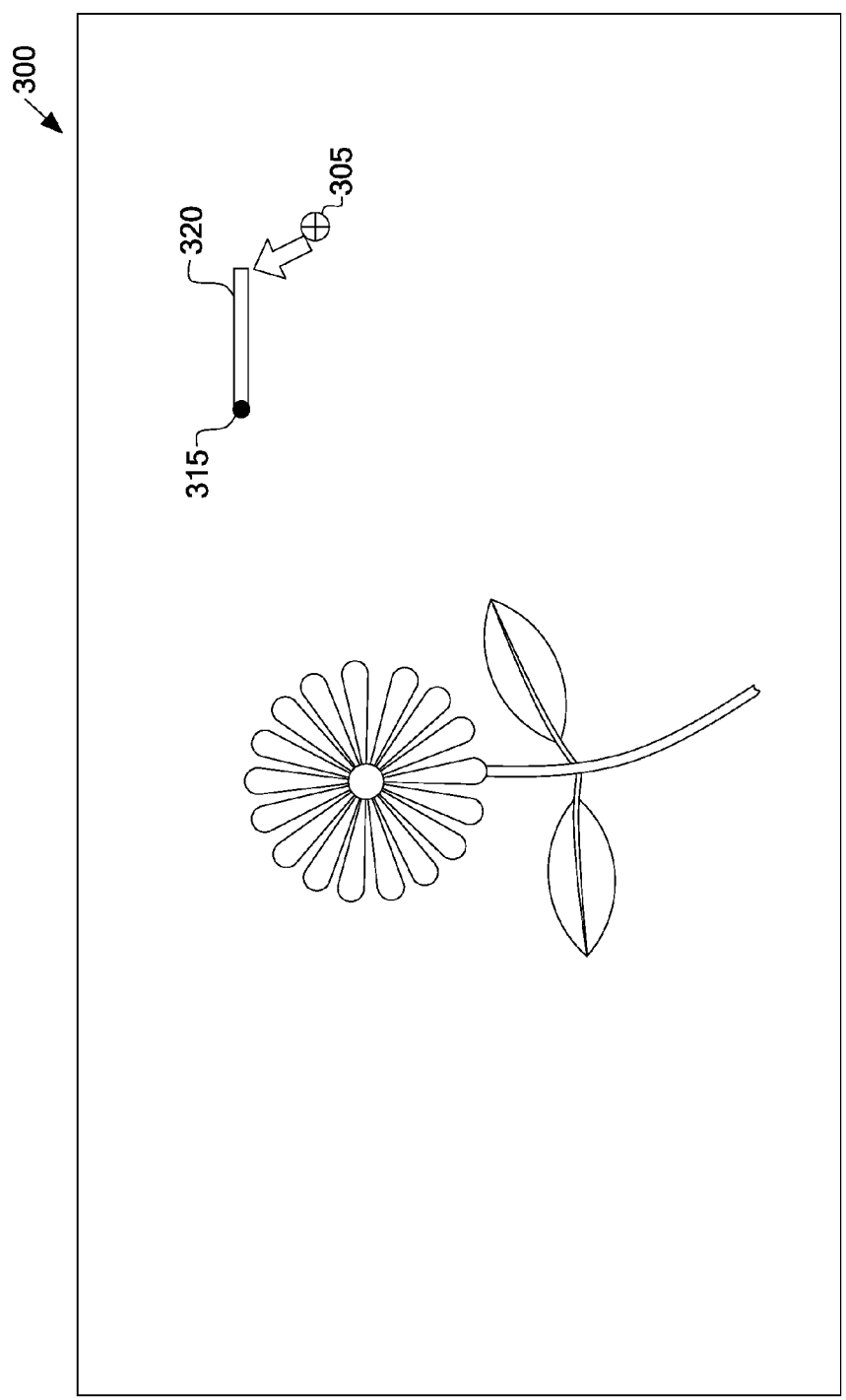
FIG. 3C is a depiction of an example editing window displaying how adjustment can be made directly on the visual media, according to an embodiment of the invention.

When the input detector detects mouse movement 310, it captures the input and converts it into a value that can be applied to the current parameter setting. So, in FIG. 3B, assume mouse movements to the left indicate that the parameter adjusting mechanism reduce the current parameter setting and mouse movements to the right indicate that parameter setting should be increased. Accordingly, mouse movement 310 causes the value for the current parameter to be reduced. As illustrated in FIG. 3C, if the user moves his mouse pointer to the right, the brightness setting value increases. In this way, the user can change a parameter setting without obscuring any other portion of the image.

How much a parameter is modified by user input depends on how far the user moves his mouse pointer to the left, right, up, down, or other direction. For example, each pixel on the screen could represent an adjustment value unit (e.g., each pixel the user moves to the left reduces the parameter setting by 1), the speed at which the user moves his mouse may be a factor in determining how to modify a setting, how long a user holds it to the left may affect the parameter setting, which direction the user moves the cursor, and other such factors. In the example above, the further the cursor is moved to the left, the more the parameter setting is reduced.

It should be noted that the exact amount the parameter setting is reduced depends on a variety of information. For example, it can depend on the type of input device being used, the size of the screen, type of application being used, user preference, and other such factors.

In one embodiment, as user input is detected by the parameter adjusting mechanism, changes to the current parameter setting are immediately applied to the visual media. For example, if the user has set a control point and moves his mouse pointer the changes that are applied to the parameter setting are also applied to the visual media. Accordingly, the user sees the direct effect of any changes to the visual media's parameters. Once the user has found or identifies the proper parameter setting, in one embodiment, the user merely has to unclick the visual media (e.g., release the mouse button) and the new parameter setting is saved. Alternatively, a different command is used to save adjustments to a parameter setting.

In one embodiment, the parameter adjusting mechanism may have a limited range of values. Alternatively, the parameter adjusting mechanism may use the features of an infinite slider to move beyond the parameter's standard range of values. Infinite sliders are described in the patent application entitled "Magnifying Visual Information Using A Center-Based Loupe", filed by Schulz et al. on Sep. 7, 2006, which is incorporated by reference in its entirety herein.

Using these techniques and tools the user can avoid many of the problems associated with conventional visual media editing applications. The user can keep his eyes on the visual media while editing it. Moreover, very little, if any, of the content in an editing window is obscured by the parameter adjusting mechanism and its controls.

Procedure for Editing with a Parameter Adjusting Mechanism

Figure 4:
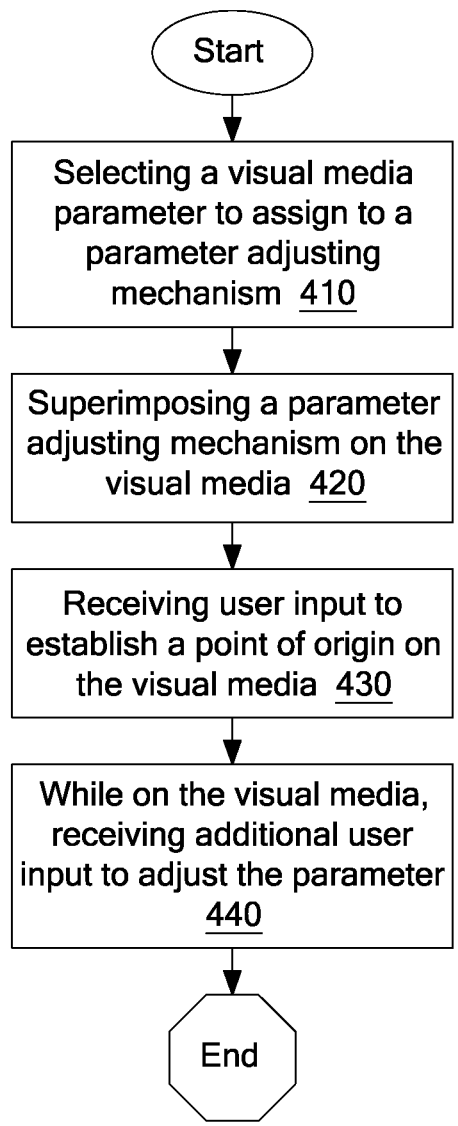
FIG. 4 is a flowchart illustrating an example procedure for editing visual media by superimposing parameter settings directly on the visual media, according to an embodiment of the invention.

Turning to FIG. 4, it is a flowchart illustrating procedure 400 for editing visual media by superimposing a parameter adjusting mechanism on it. For example, in one embodiment, procedure 400 allows a user to edit an image in a photo-editing application.

It should be noted that although, procedure 400 is discussed below in terms of a photographer editing images using a photo-editing application, the principles described in connection with procedure 400 can be applied to a wide variety of other scenarios such as editing 3D graphics, editing Web pages and other types of data objects.

Assume for this example that a photographer named Harry has just recently returned from a vacation to the Amazon jungle in Brazil. While in the jungle, Harry took a large number of pictures of the jungle wildlife and plants. Among the images Harry took is a shot of a very rare flower. He now plans to edit the picture with the intent of putting it on display in an art gallery.

Accordingly, Harry opens a photo-editing application to edit the photo. The photo-editing application includes, among other things, a user interface that allows the user to display, edit, and save images. In addition, the photo-editing application includes the necessary underlying logic to superimpose a parameter adjusting mechanism on top of displayed images. According to one embodiment, displaying the images in the photo-editing application may include importing the images from a digital camera, scanner, or other device.

It should be noted that the content and format of the images opened in the photo-editing application can vary from project to project and from implementation to implementation. For example, the photo-editing application should recognize multiple image file formats, such as JPG, GIF, TIF, RAW, BMP, etc.

Harry opens the file corresponding to the image he would like to edit. The image opens into an editing window in a visual media editing user interface like editing window 115 illustrated in FIG. 1. Once the image is opened, Harry can begin editing the image. To do so, Harry would like to be able to see as much of the image as possible. Accordingly, at step 410, Harry selects a visual media parameter to superimpose on the image. In one embodiment, this is done using a parameter adjusting mechanism as discussed above.

For example, in FIG. 1, Harry may select an option on menu bar 105 that allows him to select a parameter to edit, or he might click on a button on toolbar 108, prompting him to select a parameter to edit. Alternatively, Harry selects a parameter listed in a window (such as adjustments window 110 or other user interface control). In the end, a selected parameter is assigned to the parameter adjusting mechanism. In one embodiment, the parameter adjusting mechanism is component of the visual media editing application.

In this example, Harry believes the image needs to be brightened up, so he selects the brightness control listed in adjustments window 110. This selection makes the brightness parameter the current parameter for the parameter adjusting mechanism. In this example, the brightness setting is initially set at 43 on a scale of 0 to 100. Harry believes it needs to be increased to around 65 to make the image look the way he wants it to.

Thus, once Harry has selected the brightness parameter, at step 420, the parameter adjusting mechanism is superimposed on the image in the editing window. For example, in FIG. 1, after Harry has selected the brightness setting, all he needs to do is position his mouse pointer over editing window 115. The parameter adjusting mechanism is automatically superimposed over the image. As discussed above, the parameter adjusting mechanism is generally not visible so that the amount of screen space used by the image is maximized and the amount of screen space taken up by editing tools is minimized. By using the parameter adjusting mechanism, Harry can edit the brightness setting of the image while looking directly it, unobscured by other controls and windows.

In one embodiment, if Harry needs to, he can enlarge editing window 115 to fill more of user interface 100. In an embodiment that supports a full-screen mode, Harry can expand editing window 115 to fill the entire screen (e.g., by clicking on full-screen control 150). By clicking full-screen control 150, the image is expanded to fill the entire screen, making it easier to see the details of the image. Moreover, in a full-screen embodiment, the user interface controls that might have obscured portions of the image are hidden from view in bump areas or behind the image itself. FIG. 3A illustrates an example editing window 300 expanded to full-screen mode.

Assume for this example that Harry selects a full-screen mode and remains in the full-screen mode while he edits the image. At step 430, Harry adjusts the brightness setting of the image. First, he clicks on the image to establish a control point. For example, in FIG. 3A, he depresses and holds a button on his mouse while the mouse pointer is positioned over the image to establish the control point. The control point takes on the value of the current brightness setting (e.g., 43) and becomes the reference point for any changes to the brightness setting.

Then, at step 440, as illustrated in FIG. 3B, Harry moves his mouse pointer to the left. When he moves his mouse pointer, an input detector detects the mouse movement and converts the movement into a change in parameter setting value. As a result of the mouse movement, the brightness setting changes. As the mouse pointer moves to the left, the brightness setting goes down (e.g., from 43 to 42 to 41, etc.). The farther away from control point 315 Harry moves the cursor, the lower the brightness setting becomes.

In addition, as Harry moves his mouse pointer, the change in the brightness parameter setting is automatically applied to the image. This means that as Harry moves his mouse pointer to the left, not only does the value of the brightness setting change, but the actual image itself becomes darker, too.

Note that a parameter setting control, such as parameter setting control 305, may indicate what parameter is currently being modified. In another embodiment, the parameter setting control also displays the value of the parameter being modified. For example, the parameter setting control is a small circle indicating that the brightness setting is being adjusted. In addition, it may show the value of the brightness setting (e.g., 43). As Harry moves to the left, the number on the control counts down until it becomes 0. In one embodiment involving an infinite slider, the value may continue below the standard range of values for the parameter.

If Harry decides he likes the change in brightness, Harry simply releases his mouse button (or unclicks the control point) and the new brightness level is saved.

Now suppose Harry decides he made a mistake and really needs to increase the brightness (e.g., as he originally planned). To do so, he depresses and holds the button on his mouse again while positioned on the image, establishing a new control point. The brightness setting is the new value just saved after he released the mouse. That value becomes the fixed reference point. Then Harry moves his mouse pointer to the right (e.g., to increase the brightness setting value). As illustrated in FIG. 3C, as Harry moves the mouse pointer to the right the brightness setting increases. Once the setting reaches 65, Harry may determine that it still needs to be brightened even more. So he may keep moving the cursor to the right until the image looks the way he wants it to. He stops by releasing the mouse button, and the new setting is saved.

Now suppose Harry would like to modify the contrast settings for the image. In one embodiment, he pulls up an adjustments window, such as adjustments window 210 illustrated in FIG. 2, and selects a contrast control. Hence, contrast becomes the current parameter for the parameter adjusting mechanism. Harry then adjusts the contrast setting by clicking on a portion of the image and moving his mouse pointer back and forth as described above.

Thus, using the tools and techniques described herein, Harry can modify his photographs in a manner that minimizes the amount of screen space required to display the controls for editing them.

Hardware Overview

Figure 5:
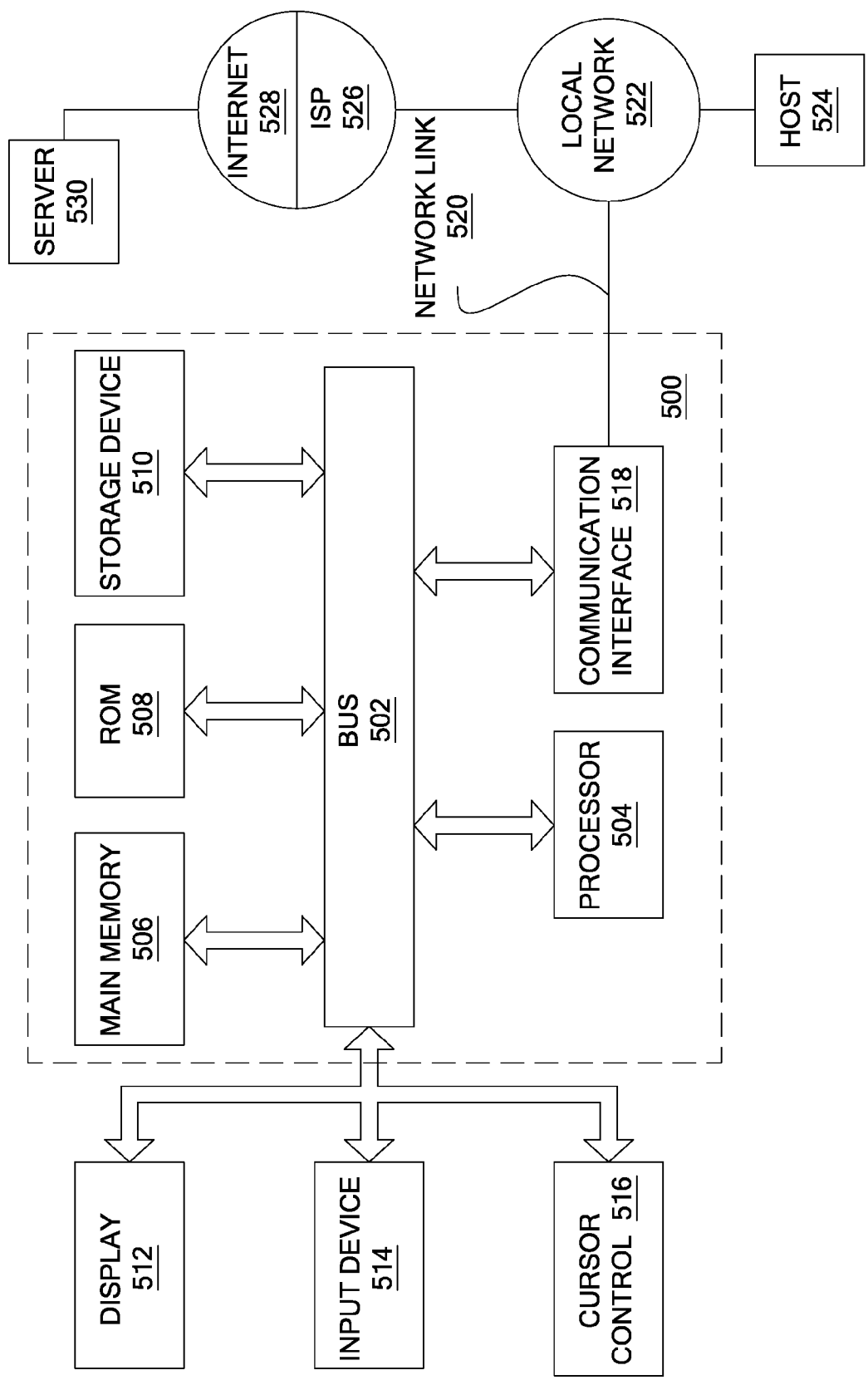
FIG. 5 is a block diagram of a computer system upon which embodiments of the invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one implementation of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative implementations, hard-wired circuitry may be used in place of or in combination with software instructions to implement the invention. Thus, implementations of the invention are not limited to any specific combination of hardware circuitry and software.

The term "machine-readable medium" as used herein refers to any medium that participates in providing data that causes a machine to operation in a specific fashion. In an implementation implemented using computer system 500, various machine-readable media are involved, for example, in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, implementations of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

I claim:

1. A method comprising:
    causing a visual media item to be displayed on a display;
    determining a reference point on the display of the visual media item in response to commencement of particular user input relative to the visual media item;
    in response to commencement of the particular user input, beginning to display a slider control superimposed on the visual media item;
    receiving first input indicating an adjustment to be made to a visual parameter of the visual media item,
    in response to receiving the first input, determining a new value for the visual parameter of the visual media item based at least in part on the first input relative to the reference point and reflecting the new value in the slider control;
    causing the display of the visual media item to be updated in accordance with the new value for the visual parameter; and
    ceasing to display the slider control in response to cessation of the particular user input;
    wherein the method is performed by one or more computing devices.

2. The method of claim 1, wherein the reference point is located, on the display of the visual media item at a variable position that is determined only in response to the commencement of the particular user input.

3. The method of claim 1, further comprising: prior to determining the reference point, receiving second input that selects the visual parameter.

4. The method of claim 1, wherein: the first input includes input that indicates a new location; and an adjustment value is calculated based on the distance between the new location and the reference point.

5. The method of claim 1, further comprising visually indicating, with a non-verbal icon that is included in a parameter setting control, which visual parameter of a plurality of visual parameters is being modified.

6. The method of claim 5, wherein the parameter setting control indicates a current value for the visual parameter.

7. The method of claim 1, further comprising: prior to determining the reference point, causing an adjustments window that includes a plurality of controls to be displayed, wherein each control of the plurality of controls corresponds to a different visual parameter of a plurality of visual parameters; and prior to receiving the first input, causing the adjustments window to be hidden from view.

8. The method of claim 1, wherein the reference point is established at a variable location that is based on a current position of a cursor at a moment at which the particular user input commences, and represents a current value of the visual parameter; wherein the commencement of the particular user input comprises a depressing of a mouse button; and wherein the cessation of the particular user input comprises a release of the mouse button.

9. A method of editing a visual media item in a visual media editing application, the method comprising:
    receiving first input that selects a parameter, wherein the parameter has a current value;
    after the first input is received, selecting a reference point on the visual media item to be a current position of a pointer at a time that a particular button is depressed, regardless of where the pointer is within the visual media item at the time that the particular button is depressed;
    after determining the reference point, continuously receiving second input that indicates an adjustment to the current value of the parameter for as long as the particular button remains depressed;
    in response to receiving the second input, continuously determining, based at least in part on the second input relative to the reference point, and only for as long as the particular button remains depressed, a new value for the parameter that is different than the current value; and
    continuously causing a display of the visual media item to change in accordance with the new value for the parameter for as long as the particular button remains depressed and without displaying any control for adjusting the parameter; wherein the method is performed by one or more computing devices.

10. The method of claim 9, wherein the reference point is at a variable location on the visual media item that is determined only in response to the depressing of the particular button.

11. The method of claim 9, wherein: the second input includes input that indicates a new location; and an adjustment value is calculated based on the distance between the new location and the reference point.

12. The method of claim 9, further comprising: prior to receiving the first input, causing an adjustments window that includes a plurality of controls to be displayed, wherein each control of the plurality of controls corresponds to a different parameter of a plurality of parameters; and prior to receiving the second input, causing the adjustments window to be hidden from view.

13. A computer-readable memory storing instructions which, when executed by one or more processors, cause:
    causing a visual media item to be displayed on a display;
    determining a reference point on the display of the visual media item in response to commencement of particular user input relative to the visual media item;
    in response to commencement of the particular user input, beginning to display a slider control superimposed on the visual media item;
    receiving first input indicating an adjustment to be made to a visual parameter of the visual media item;
    in response to receiving the first input, determining a new value for the visual parameter of the visual media item based at least in part on the first input relative to the reference point and reflecting the new value in the slider control;

causing the display of the visual media item to be updated in accordance with the new value for the visual parameter; and ceasing to display the slider control in response to cessation of the particular user input.

14. The computer-readable memory of claim 13, wherein the reference point is located, on the display of the visual media item, at a variable position that is determined only in response to the commencement of the particular user input.

15. The one or more storage media computer-readable memory of claim 13, wherein the instructions, when executed by the one or more processors, further cause: prior to determining the reference point, receiving second input that selects the visual parameter.

16. The computer-readable memory of claim 13, wherein: the first input includes input that indicates a new location; and an adjustment value is calculated based on the distance between the new location and the reference point.

17. The computer-readable memory of claim 13, wherein the instructions, when executed by the one or more processors, further cause visually indicating, with a non-verbal icon that is included in a parameter setting control, which visual parameter of a plurality of visual parameters is being modified.

18. The computer-readable memory of claim 17, wherein the parameter setting control indicates a current value for the visual parameter.

19. The computer-readable memory of claim 13, wherein the instructions, when executed by the one or more processors, further cause: prior to receiving the first input, causing an adjustments window that includes a plurality of controls to be displayed, wherein each control of the plurality of controls corresponds to a different visual parameter of a plurality of visual parameters; and prior to receiving the first input, causing the adjustments window to be hidden from view.

20. The computer-readable memory of claim 13, wherein the reference point is established at a variable location that is based on a current position of a cursor at a moment at which the particular user input commences, and represents a current value of the visual parameter; wherein the commencement of the particular user input comprises a depressing of a mouse button; and wherein the cessation of the particular user input comprises a release of the mouse button.

21. A computer-readable memory storing instructions for editing a visual media item in a visual media editing application, wherein the instructions, when executed by one or more processors, cause:

receiving first input that selects a parameter, wherein the parameter has a current value;

after the first input is received, selecting a reference point on the visual media item to be a current position of a pointer at a time that a particular button is depressed, regardless of where the pointer is within the visual media item at the time that the particular button is depressed;

after determining the reference point, continuously receiving second input that indicates an adjustment to the current value of the parameter for as long as the particular button remains depressed;

in response to receiving the second input, continuously determining, based at least in part on the second input relative to the reference point, and only for as long as the particular button remains depressed, a new value for the parameter that is different than the current value; and continuously causing a display of the visual media item to change in accordance with the new value for the parameter for as long as the particular button remains depressed and without displaying any control for adjusting the parameter.

22. The computer-readable memory of claim 21, wherein the reference point is at a variable location on the visual media item that is determined only in response to the depressing of the particular button.

23. The computer-readable memory of claim 21, wherein: the second input includes input that indicates a new location; and an adjustment value is calculated based on the distance between the new location and the reference point.

24. The computer-readable memory of claim 21, wherein the instructions, when executed by the one or more processors, further cause: prior to receiving the first input, causing an adjustments window that includes a plurality of controls to be displayed, wherein each control of the plurality of controls corresponds to a different parameter of a plurality of parameters; and prior to receiving the second input, causing the adjustments window to be hidden from view.

* * * * *

UNITED STATES PATENT AND TRADEMARK OFFICE
CERTIFICATE OF CORRECTION

PATENT NO. : 8,453,072 B2  
APPLICATION NO. : 13/110794  
DATED : May 28, 2013  
INVENTOR(S) : Melissa Erin Breglio Page 1 of 1

It is certified that error appears in the above-identified patent and that said Letters Patent is hereby corrected as shown below:

In the Claims

In claim 1, column 13, line 43, please replace "slider" with -- the parameter setting --.
In claim 13, column 14, line 66, please replace "slider" with -- the parameter setting --.
In claim 13, column 15, line 4, please replace "slider" with -- the parameter setting --.
In claim 15, column 15, line 10, please replace "one or more storage media" with
-- computer-readable memory --.
In claim 17, column 15, line 22, please replace "a" with -- the --.

Signed and Sealed this
Thirtieth Day of July, 2013

Teresa Stanek Rea
*Acting Director of the United States Patent and Trademark Office*